United States Patent [19]
Darboven et al.

[11] 3,794,771
[45] Feb. 26, 1974

[54] TIME-SHARED FREQUENCY TRACKING LOOP

[75] Inventors: Ernest F. Darboven, Katonah; Leon R. Solomon, Ossining, both of N.Y.

[73] Assignee: The Singer Company, New York, N.Y.

[22] Filed: Sept. 7, 1972

[21] Appl. No.: 287,111

Related U.S. Application Data

[62] Division of Ser. No. 159,861, July 6, 1971, Pat. No. 3,710,386.

[52] U.S. Cl. ........................................ 179/15 BL
[51] Int. Cl. ........................................ H04j 3/00
[58] Field of Search ............................ 179/15 BL

[56] References Cited

UNITED STATES PATENTS

| | | | |
|---|---|---|---|
| 2,462,117 | 2/1949 | Mikkelson | 179/15 BL |
| 2,757,283 | 7/1956 | Ingerson | 179/15 BL |
| 2,911,528 | 11/1959 | McRae | 179/15 BL |
| 3,197,565 | 7/1965 | Yoder | 179/15 BL |

*Primary Examiner*—Ralph D. Blakeslee
*Attorney, Agent, or Firm*—Thomas W. Kennedy

[57] ABSTRACT

In a frequency tracking loop, a single voltage-controlled local oscillator produces a sequence of output signals representing the respective peak power frequencies in a recycling sequence of input signals. The oscillator output is compared to the input signals to produce a DC error signal passed to a single operational amplifier. Integrating capacitors are alternately coupled between the amplifier's input and output in a synchronized sequence corresponding to the input signals. The amplifier output, which controls the oscillator frequency, is thus repeatedly switched from one value to the next representing the last corresponding voltage in the previous cycle.

5 Claims, 5 Drawing Figures

TIME-SHARED FREQUENCY TRACKING LOOP

This is a division, of application Ser. No. 159,861, filed July 6, 1971, now U.S. Pat. No. 3,710,386.

BACKGROUND OF THE INVENTION

The invention relates generally to the fields of frequency measuring systems and multiplexing or timesharing, and more particularly to improved schemes for sharing various components of sine-cosine type frequency tracking loops monitoring several input channels in a repetitive sequence.

In signal processing for systems like radar or sonar, the first task is nearly always to isolate the informational content of a raw, incoming analog signal from unwanted spurious signals like broad band receiver noise, which in some cases may completely mask the desired information. During this procedure, if signals carrying information from a number of sources or channels are received separately, the signals usually must be handled separately to avoid attributing the information to the wrong source. While separate handling is therefore desirable, in the prior art it often led to a bulky multiplicity of processing devices so that each informational channel was in effect served by a separate, corresponding processing system.

In the particular case of airborne doppler radar navigating systems, several beams of microwave energy are obliquely transmitted at the ground and received in a repeated sequence. The received signals may consist, for example, of four independent channels, corresponding to four multiplexed beams, repeatedly updated and examined to identify their doppler spectra. A frequency tracking loop is commonly employed to maintain a plurality of corresponding local oscillators at discrete frequencies representative of the peak power frequency in the spectra of each channel. In the past, only the discriminator or frequency comparing component of the loop has been time-shared by the input channels. The discriminator error signal was used to drive a plurality of separate integrator amplifiers and oscillators which were switched in and out of the loop according to the sequence of input doppler channels. Even during the periods when a particular integrator amplifier and oscillator were not receiving new information from the corresponding channel, the oscillator, maintained by the integrator, continued to operate at the last tracking frequency. While the use of several integrator amplifiers and oscillators is functionally satisfactory, suitable high performance, matched oscillator circuits and DC operational amplifiers contribute a significant share of the cost of the processor.

SUMMARY OF THE INVENTION

The general purpose of the invention is to timeshare as many components as possible in a multiplexed frequency tracking loop without degrading the tracking ability of the loop. A specific object of the invention is to reduce the size, cost and complexity of a frequency tracking loop for sequential inputs by limiting the plural or reiterative elements to those which are inherently storage components and by time-sharing the remaining non-storage elements of the loop.

These and other objects of the invention are accomplished in a multichannel doppler processor by providing a time-shared frequency tracking loop with a single voltage-controlled local oscillator to replicate sequentially the peak power frequency of the doppler spectra of each channel. The oscillator output is compared to the doppler signals in a discriminator to produce a DC error signal which forms the input to a single DC operational amplifier whose output voltage controls the frequency of the oscillator. Integrating capacitors are selectively coupled by a series of gates between the amplifier's input and output in a synchronized sequence corresponding to the input doppler signals. While the capacitors are being switched, a de-glitch pulse is introduced to prevent any connection between the capacitors. The amplifier output is repeatedly switched from one value to the next along with the sequence of doppler inputs. Each voltage to which the amplifier output is switched thus represents the last corresponding voltage in the previous cycle of input signals.

DESCRIPTION OF THE PREFERRED EMBODIMENT

Figure 1:
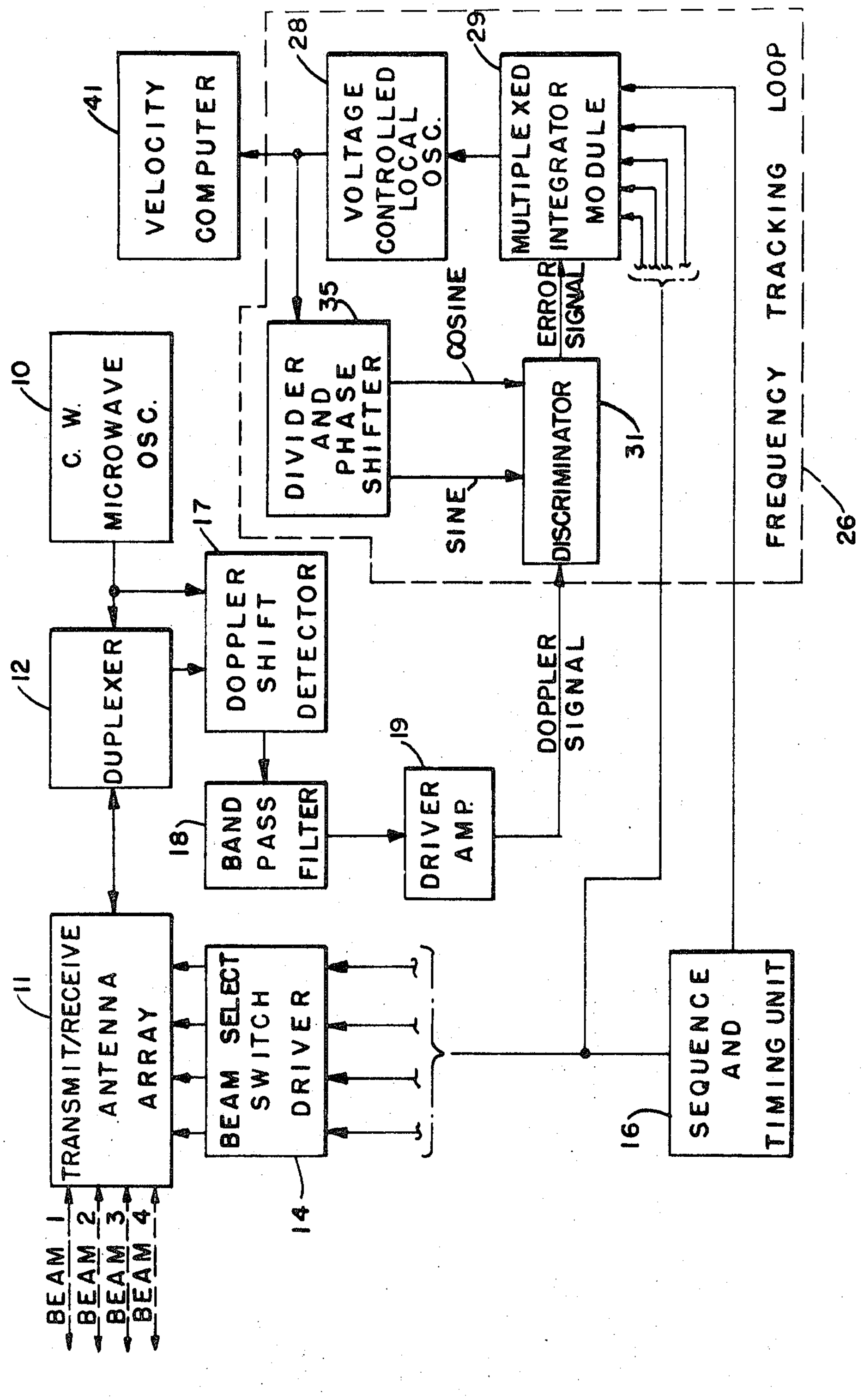
FIG. 1 is a block diagram of a navigational doppler radar system having a frequency tracking loop according to the invention.

Referring to the drawings, FIG. 1 illustrates a specific application of the time-shared frequency tracking loop to a doppler radar navigational system for computing aircraft velocity. While more sophisticated systems using coded, pulsed or frequency modulated radar signals are currently available, the basic continuous wave doppler system is shown to emphasize the unique operation of the tracking loop. The output of a microwave oscillator, typically operating at about 13.325 Gigahertz, is passed to an antenna array 11 via a duplexer 12. Array 11 may comprise a single fixed or steerable antenna or a plurality of individual antennas capable of projecting and receiving energy in several thin beams aimed obliquely at the earth's surface. For illustration, array 11 is shown producing four separate beams. A typical four beam pattern for determining heading and drift velocities is shown in U.S. Pat. No. 3,150,375 to Bevan et al. which employs one pair of forward beams aimed downwardly to the left and right of the airplane's forward heading and a second pair of aft beams similarly oriented. Microwave energy fed to array 11 from oscillator 10 is sequentially distributed to beams 1, 2, 3, and 4 by a beam select switch driver 14 which continuously recycles the four beams at about 7.5 Hertz by means of a sequence and timing unit 16. As the beams are switched, reflected microwave energy is also received by array 11 and passed via duplexer 12 to a doppler shift detector 17 which extracts the doppler phase shift frequency by comparison with the reference output of oscillator 10. Those familar with the principles of doppler radar will recognize that the output of detector 17 is zero when there is no relative velocity between array 11 and the surface from which one of the beams is reflected. If, however, the aircraft is flying at a particular velocity, the output of detector 17 will contain a doppler shift frequency related to the velocity component of the aircraft in the direction of the beam. Since noise and ground clutter are ordinarily included in the reflected signal, the shift frequency attributable to aircraft velocity is identified as the peak power or center frequency in the spectrum of returned frequencies. The output of detector 17 is passed via a suitable band pass filter 18 and driver amplifier 19 to a frequency tracking loop 26 which determines the mean or center frequency of the doppler spectrum.

Loop 26 has three essential components: a voltage-controlled local oscillator 28 whose frequency is controlled by the output voltage of a multiplexed integrator module 29 responsive to the output of discriminator 31. Each doppler spectrum is compared by discriminator 31 with the frequency of local oscillator 28 received via a divider and phase shifter unit 35 which provides the sine and cosine to discriminator 31 at, for example, one-fourth the frequency produced by oscillator 28. Because of the noise-like character of the doppler return, the DC output of discriminator 31 cannot be directly applied to oscillator 28 but must first be entered into integrator module 29 to assure a smooth continuous control signal and to provide high static accuracy.

The function of loop 26 is to maintain local oscillator 28 at a frequency which is proportional to the center frequency in the doppler spectra from dirver amplifier 19. The output of local oscillator 28 is therefore proportional to the velocity component in the direction of a given beam. The output of oscillator 28 may be used in a velocity computer 41 to generate analog or digital signals representative of the aircraft's heading and drift velocities by adding and subtracting the doppler frequencies associated with beams 1, 2, 3, and 4. The mathematical relationship between these velocities and the doppler returns from oblique forward and aft beams has long been understood. The details of a suitable computer to perform these calculations are adequately shown in U. S. Pat. No. 2,981,944 to Washburne.

Figure 2:
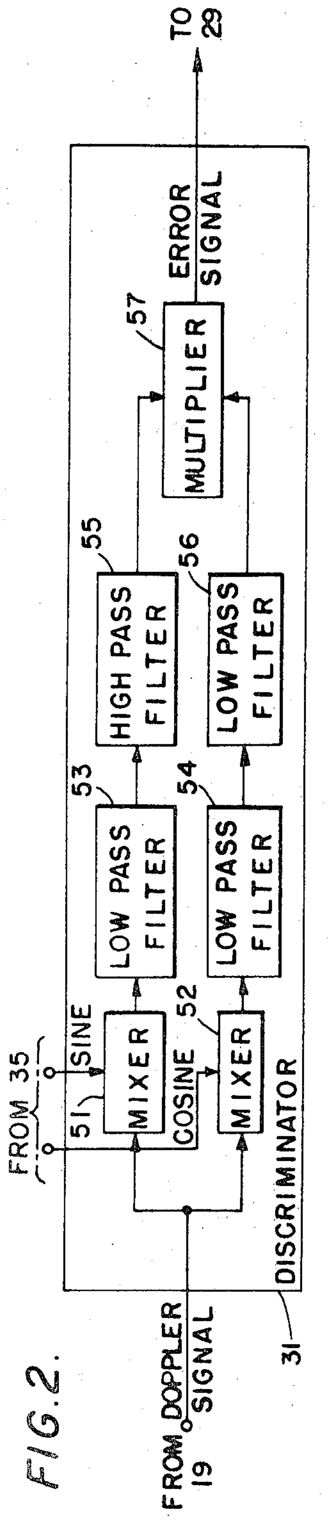
FIG. 2 is a block diagram of the discriminator of FIG. 1.

Referring now to FIG. 2, the elements of discriminator 31 to form a balanced demodulator comprising a pair of sine and cosine mixers 51 and 52 operatively receiving the output of local oscillator 28 in quadrature. Both mixers 51 and 52 receive the same sequential doppler signals from amplifier 19. The sum and difference of these signals and the sine and cosine oscillator outputs of unit 35 are generated by mixers 51 and 52. The outputs of mixers 51 and 52, 90° out of phase, are passed through respective low pass filters 53 and 54 to select the difference signals. Next, the sine output of filter 53 is passed through a high pass filter 55 and the cosine output of filter 54 through a low pass filter 56 to shift the signals 90° back into phase with each other. The in-phase difference signals are then fed to a multiplier 57 producing a DC output which is proportional to the difference between the divided output of local oscillator 28 and the peak power frequency of the doppler input signal to discriminator 31. The multiplier output is positive when the oscillator output of unit 35 is greater than the doppler input signal, and negative if it is less (the sine of a negative angle is negative, while the cosine remains positive). The polarity of the error signals is such as to drive oscillator 28 in the right direction to reduce the error signal. One suitable method of implementing multiplier 57 is to pass the outputs of filters 55 and 56 to a sum-difference amplifier having sum and a difference outputs rectified and subtracted from each other in a diode bridge to provide a substitute for true multiplication.

Figures 3, 4:
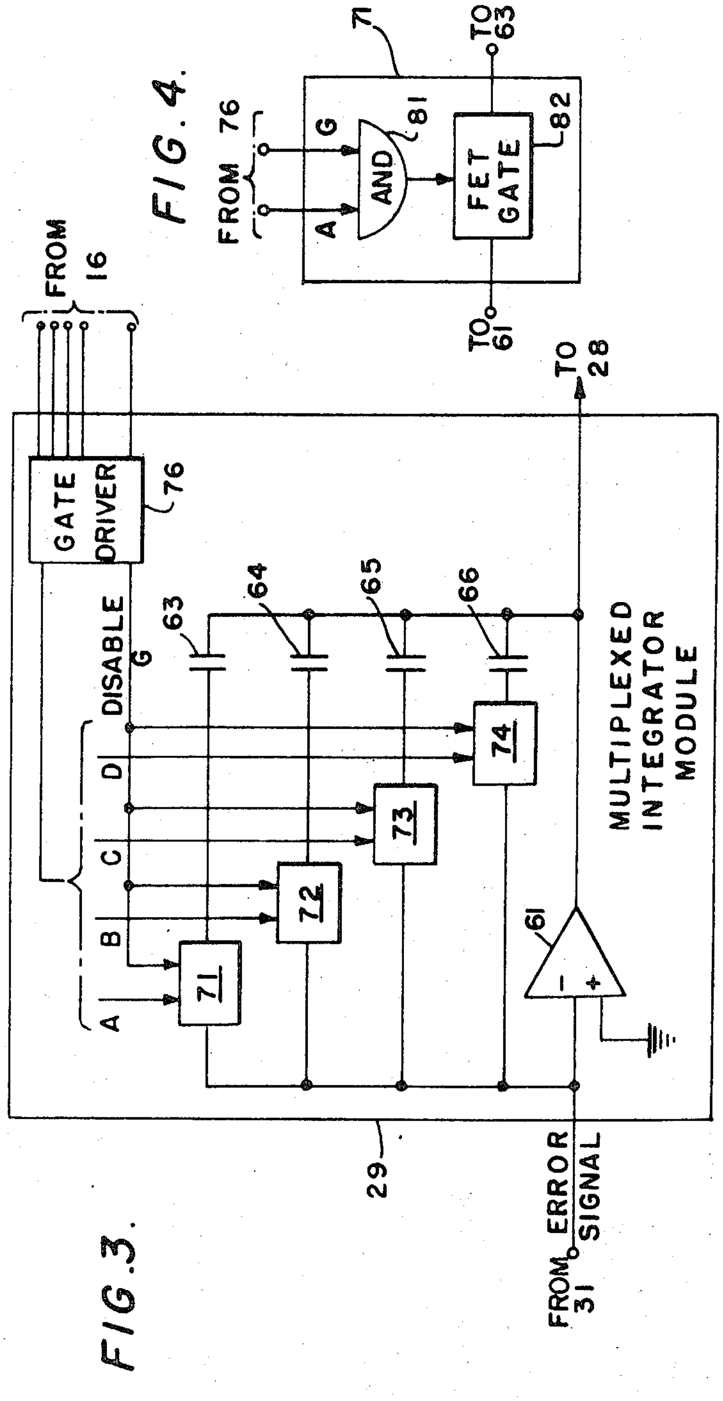
FIG. 3 is a block and schematic diagram of the multiplexed integrator module of FIG. 1.
FIG. 4 is a block diagram illustrating a particular means of implementing a typical capacitor gate in the integrator module of FIG. 3.

Referring now to FIG. 3, multiplexed integrator module 29 comprises a single high gain DC operational amplifier 61 receiving the error signal from discriminator 31. Four capacitors, 63, 64, 65, and 66, corresponding respectively to beams 1 through 4 (FIG. 1), are coupled separately in parallel between the input and output of amplifier 61 to enable module 29 to follow the progress of the doppler center frequency in the respective beams. A set of gates 71, 72, 73 and 74, disposed in the paths of capacitors 63 through 66, accomplishes the necessary switching. The four-line array timing signal from timing unit 16 (FIG. 1) is connected via a gate driver 76 to synchronize the sequential operation of gates 71 through 74 with the beam switching of array 11. To prevent two capacitors from being interconnected at any given time permitting unwanted transfer of charge, gates 71 through 74 are simultaneously disabled by a separate line from timing unit 16 via gate driver 76 which briefly opens the gates during the switching transition from one beam to the next. The disabling pulses may be generated by timing unit 16 as a function of the four-line switching output.

One of the ways in which gates 71 through 74 may be implemented requires an AND gate 81 or its equivalent to drive a field effect transistor gate 82 which connects and disconnects capacitor 63, for example (FIG. 4). Assuming that gate 82 is to be closed when line A of the four-line timing signal is positive or "high," the disable line G would be normally positive, going negative briefly to open the gate during switching.

In operation, when beam 1 is selected, all of the discriminator error signal will be fed to capacitor 63. Since amplifier 61 is a high-gain differential amplifier, the current input to the amplifier can be ignored, and assuming that gates 72, 73 and 74 are perfectly "open," the voltage output of amplifier 61 will reflect integration of the DC error signal from discriminator 31 corresponding to beam 1. When timing unit 16 signals the end of the beam 1 period and the beginning of the beam 2 period, gate 71 is opened, and since there is now no discharge path for capacitor 63, it will retain the charge which it accumulated or "integrated" during the beam 1 period by removing and storing the voltage from the output of amplifier 61 which controls oscillator 28. After passing through similar periods for beams 2, 3, and 4, the period for receipt of energy in beam 1 recurs and further accumulation of charge by capacitor 63 takes place, assuming that an error signal from discriminator 31 is still present. Of course, if local oscillator 28 has already been slewed to the correct frequency, there will be no error signal during the beam 1 period.

Figure 5:
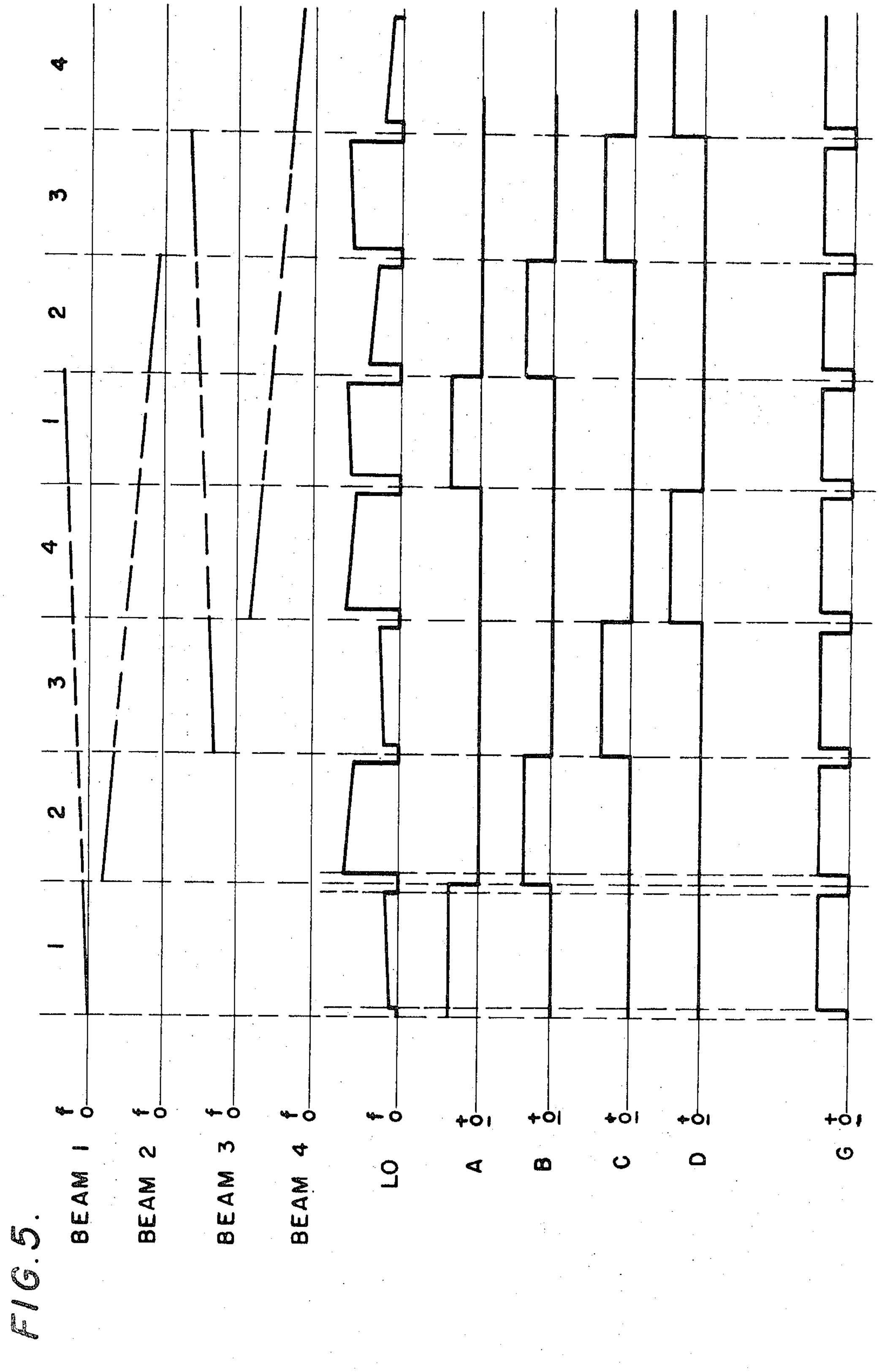
FIG. 5 is a timing diagram illustrating a typical sequence of signals in the system of FIG. 1.

Two complete cycles of beams 1 through 4 are illustrated in FIG. 5. The period of one complete cycle, $T_1$, is typically 133 milliseconds (7.5 Hertz), each sample beam period, $T_2$, being 33 milliseconds long. Lines A, B, C, and D represent both the beam switching from array 11 and the control input to gates 71 through 74. The disable pulse illustrated in line G typically lasts about 4 microseconds ($T_3$) to cover the interpulse switching time. The lines representing beams 1 through 4 indicate exaggerated changes in peak power frequencies on the four channels as they are sampled once every 133 milliseconds. Such changes might be produced by sustained acceleration in the direction of heading and drift. Oscillator 28 produces an output analog (line LO) for the frequency in each beam period. The LO output is interrupted during each disable pulse since no capacitors are connected.

It should be understood that the principle of providing a frequency tracking loop in which both the local oscillator and DC amplifier are time-shared can be applied to systems other than the doppler radar navigation system herein disclosed. Any frequency measuring or tracking apparatus having a sequenced plurality of inputs may provide a potential application for the invention. Local oscillator 28 and amplifier 61 must of course be of suitable quality to allow relatively instantaneous switching. Those skilled in designing amplifier integrator systems will recognize that the slew rate of amplifier 61, or the rate at which it can switch from one voltage to another voltage, may be a significant factor in the selection of a suitable amplifier and oscillator combination.

One of the most compelling advantages of the invention lies in reducing the cost, size and complexity of the frequency tracking loop. In the past, loops for tracking four sequenced signals required four local oscillators, four DC amplifiers, and four capacitors. The invention eliminates this multiplicity, except for the capacitors, which constitute the only true storage elements in the loop. By using one DC amplifier instead of a plurality, another less evident advantage is obtained: the cancellation of amplifier bias errors when the desired output of computer 41 is the frequency difference between the spectra in any two beams or channels.

It will be understood that various changes in the details, materials, steps and arrangements of parts which have been herein described and illustrated in order to explain the nature of the invention may be made by those skilled in the art within the principle and scope of the invention as expressed in the appended claims.

What is claimed is:

1. A time-shared frequency tracking loop for a repeating sequence of input-signals from a plurality of channels, comprising a single variable frequency oscillator;

a discriminator means operatively receiving said sequence of input signals and said oscillator output for providing an output indicative of a frequency difference between said input signals and said oscillator output; and time-shared integrator means for producing a sequential control output to said oscillator having a single DC amplifier providing said control output with an input connected to receive said discriminator output, a plurality of capacitive elements corresponding respectively to said channels, and switching means responsive to a timing signal indicative of said sequence for connecting and disconnecting respective ones of said capacitive elements between the input and output of said amplifier in a corresponding repeating sequence.

2. The tracking loop of claim 1 wherein;

said switching means includes means for diconnecting all of said capacitive elements from said amplifier at times corresponding to the disconnecting of one capacitive element and the connecting of another.

3. The tracking loop of claim 1 wherein;

said switching means includes a plurality of parallel feedback lines between the input and output of said amplifier including respective gate means responsive to the timing signal for opening and closing said feedback lines in said corresponding repeating sequence, respective ones of said capacitive elements being operatively disposed in said lines in series with said respective gate means.

4. The tracking loop of claim 3 wherein;

said switching means further includes inhibit means connected to said gate means for simultaneously opening all of said feedback lines to prevent transfer of charge between said capacitive elements at times corresponding to the opening of one said line and the closing of another by said gate means.

5. The tracking loop of claim 3 further comprising phase-shifter means connected to said oscillator for providing sine and cosine outputs to said disriminator means; and said discriminator means being a balanced demodulator with DC output.

* * * * *